(12) United States Patent
Hansson

(10) Patent No.: US 6,526,047 B1
(45) Date of Patent: Feb. 25, 2003

(54) SINGLE POINT WRITING OF CONTROL INFORMATION

(75) Inventor: Ulf Hansson, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/141,162

(22) Filed: Aug. 27, 1998

(30) Foreign Application Priority Data

Aug. 28, 1997 (SE) .............................................. 9703105
Jan. 30, 1998 (SE) .............................................. 9800278

(51) Int. Cl.[7] .................................................. H04J 3/00
(52) U.S. Cl. ........................ 370/360; 370/371; 370/396
(58) Field of Search ................................. 370/360, 387, 370/388, 363, 367, 368, 396, 361, 371, 374, 378, 381

(56) References Cited

U.S. PATENT DOCUMENTS

| 4,038,497 A | * | 7/1977 | Collins et al. ............... 370/371 |
| 4,797,589 A | * | 1/1989 | Collins ........................ 370/371 |
| 5,631,902 A | * | 5/1997 | Yoshifuji ..................... 370/388 |
| 5,815,816 A | * | 9/1998 | Isumi .......................... 455/458 |
| 6,212,193 B1 | * | 4/2001 | Christie ....................... 370/410 |

FOREIGN PATENT DOCUMENTS

| EP | 0 418 475 | 3/1991 |
| WO | 93/16568 | 8/1993 |
| WO | 93/26133 | 12/1993 |
| WO | 95/20302 | 7/1995 |
| WO | 97/09839 | 3/1997 |

* cited by examiner

Primary Examiner—Ken Vanderpuye

(57) ABSTRACT

A system provides control information from a control system to a number of control stores in a switch. The system includes a control point which receives control information for distribution to predetermined control stores. The control information for a point-to-point connection includes a first control code C1 and a second control code C2. The system further includes a first link providing the first control code C1 to a first control store, a number of selectively active links, each of which provides, when active, the second control code C2 from the control point to a respective further control store, and circuitry for activating one of the selectively active links in response to the first control code C1.

19 Claims, 6 Drawing Sheets

SINGLE POINT WRITING OF CONTROL INFORMATION

TECHNICAL FIELD

The present invention generally relates to telecommunications and a method and system for providing control information to control stores in a communication switch.

BACKGROUND

In a circuit-switched communication switch, point-to-point connections are generally established under the control of a control system which sets appropriate control stores in the switch structure so as to create circuits between predetermined input multiple positions and predetermined output multiple positions.

In distributed or modular communication switches, it is normally necessary for the control system to provide control information, for each point-to-point connection, to more than one control store in the switch. The control stores associated with a point-to-point connection in such a distributed switch are generally arranged in different switch modules in the switch. The normal procedure is to let the traffic control software in the control system interface each control store associated with the point-to-point connection in question. However, this renders the traffic control software rather complex. In addition, it is normally not possible to utilize conventional standard traffic control software already developed and available for ordinary non-modular switches.

SUMMARY

The present invention overcomes these and other drawbacks of the prior art arrangements.

It is a general object of the invention to provide a method and system for efficiently providing control information, for a point-to-point connection, from a control system to a number of control stores in a communication switch.

It is also an object of the invention to provide a communication switch which comprises a system for efficiently providing control information, for a point-to-point connection, from a control system to a number of control stores in the communication switch.

This object and other objects are met by the invention.

In accordance with a general inventive concept, a system for providing control information from a control system to a number of control stores in a communication switch is provided. The, system generally comprises a control point which receives control information from the control system to distribute the control information to predetermined control stores in the communication switch. The control information includes at least a first control code C1 and a second control code C2. These control codes C1 and C2 constitute control information for a point-to-point connection through the communication switch.

The system further comprises:
a first hardware link connecting the control point to a predetermined first control store in the switch for providing the first control code C1 from the control point to the first control store;
a number of selectively active hardware links, each one of which connects the control point to a respective predetermined further control store to provide, when active, the second control code C2 from the control point to the further control store; and
circuitry arranged to activate at least one of the selectively active hardware links in response to the first control code C1.

In a preferred embodiment of the invention, the link activating circuitry is a decoder which includes a first control input for receiving the first control code C1, a second input for receiving the second control code C2, and selectively active outputs. Each one of the selectively active outputs is connected to the second input by an internal connection, and to a respective one of the selectively active hardware links. The decoder further includes decoding circuitry, preferably in the form of a gate network, connected to the first control input for decoding the first control code C1 to activate one of the selectively active outputs so as to forward the second control code C2 through the activated output, thus activating the corresponding hardware link.

Preferably, the communication switch is a modular switch which comprises a number of switch modules cooperating with switch adapter modules. In an illustrative communication switch, the first control store is arranged in a switch adapter module, whereas the further control stores are arranged in different switch modules.

The invention offers the following advantages:
control information is provided to the control stores in the switch in an efficient manner;
the complexity of the traffic control software in the control system is prevented from increasing to unreasonably high levels; and
the control system need not be concerned about the internal hardware configuration of the communication switch, and traffic control software already developed for conventional switches can be used.

Other advantages offered by the present invention will be appreciated upon reading of the below description of the embodiments of the invention.

BRIEF DESCRIPTION OF THE DRAWINGS

The novel features believed characteristic of the invention are set forth in the appended claims. The invention itself, however, as well as other features and advantages thereof will be best understood by reference to the detailed description of the specific embodiments which follows, when read in conjunction with the accompanying drawings, wherein:

DETAILED DESCRIPTION

Figure 1:
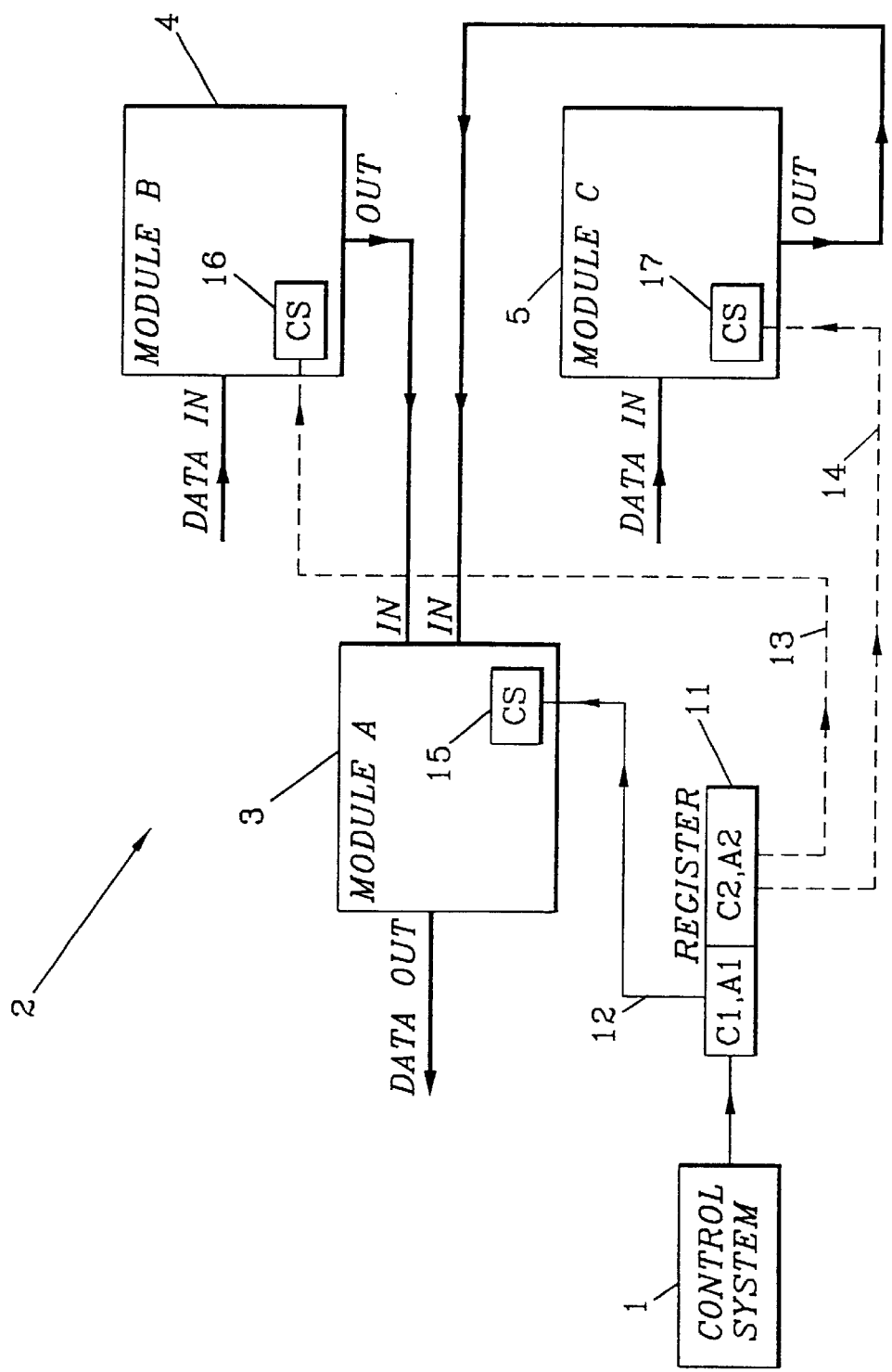
FIG. 1 is a schematic diagram showing pertinent components of an illustrative communication switch incorporating a system for providing control information from a control system to control stores in the switch according to a preferred embodiment of the invention.

FIG. 1 is a schematic diagram showing pertinent components of an illustrative communication switch incorporating a system for providing control information to control stores according to a preferred embodiment of the invention. The communication switch 2 is a modular switch, also referred to as a distributed switch, which comprises a number of switch modules. For clarity only three switch modules 3–5, module A, module B and module C, are illustrated. Each switch module generally includes a number of control stores CS, but for clarity and simplicity, each switch module is illustrated with a single control store. The switch modules A, B and C, include the control stores 15, 16 and 17, respectively. In this illustrative example, the switch modules B and C act as input interface to the overall switch 2 and receive input data DATA IN to the switch 2. The outputs OUT of the switch modules B and C are connected to the inputs IN of the switch module A which acts as output interface of the overall switch 2 and outputs data DATA OUT from the switch 2. As an example, the switch module A may be a switch module with a space switching functionality, and the switch modules B and C may be conventional time-space switch modules.

In order to establish a point-to-point connection through the overall distributed switch 2, control information has to be provided from a control system 1 to more than one control store in the switch 2. In this example it is assumed that in order to establish a point-to-point connection through the switch 2, control information has to be provided to the control store 15 in switch module A, and to at least one of the control stores 16 and 17 in switch modules B and C.

According to the present invention, for each point-to-point connection through the distributed switch 2, the control system 1 writes control information that establishes a complete point-to-point connection into a single control point such as a register 11. The control information is normally transferred in parallel over a link from the control system 1 to the control point. From this point, appropriate parts of the control information is then distributed to the respective control stores 15, 16, 17 through hardware links. Hence, the switch 2 is further provided with a register 11 and associated hardware links 12, 13, 14. The register 11 receives control information which includes a first control code C1 and a second control code C2 from the control system. The first control code C1 and the second control code C2 constitute control information for a point-to-point connection through the switch 2. The first control code C1 relates to the control store 15 in switch module A, and the second control code C2 relates to one of the control stores 16, 17 in modules B and C. The control system also provides address information, a first address code A1 associated with the first control code C1 and a second address code A2 associated with the second control code C2, to the register 11. The address codes A1 and A2 determines the storage positions in the control stores 15 and 16/17 into which the control codes C1 and C2, respectively, are written. Hence address code A1 relates to control store 15 and points out a storage position therein for control code C1, and address code A2 relates to one of the control stores 16, 17 and points out a storage position therein for control code C2. A hardware link 12 connects the register 11 to the control store 15 in module A and provides the first control code C1 from the register 11 to the control store 15. A selectively active hardware link 13 connects the register 11 to the control store 16 in module B to provide, when active, the second control code C2 from the register 11 to the control store 16. A selectively active hardware link 14 connects the register 11 to the control store 17 in module C to provide, when active, the second control code C2 to the control store 17.

Of course, each switch module 3–5 includes conventional write logic circuitry which receives the control code and address code in question for performing the actual writing of the control code into the corresponding control store according to the associated address code. This will be explained in more detail in connection with FIG. 3.

The register 11 is normally considered as a real hardware register, and it is easier to understand the invention when thinking of the register 11 in that way. In a preferred practical implementation however, the register 11 is generally realized as a virtual register. The individual bits of the control and address information are placed in a determined way on the link from the control system, and any arbitrary point along this link can be viewed as a virtual register. The control and address information passes the virtual register flying.

Figure 2:
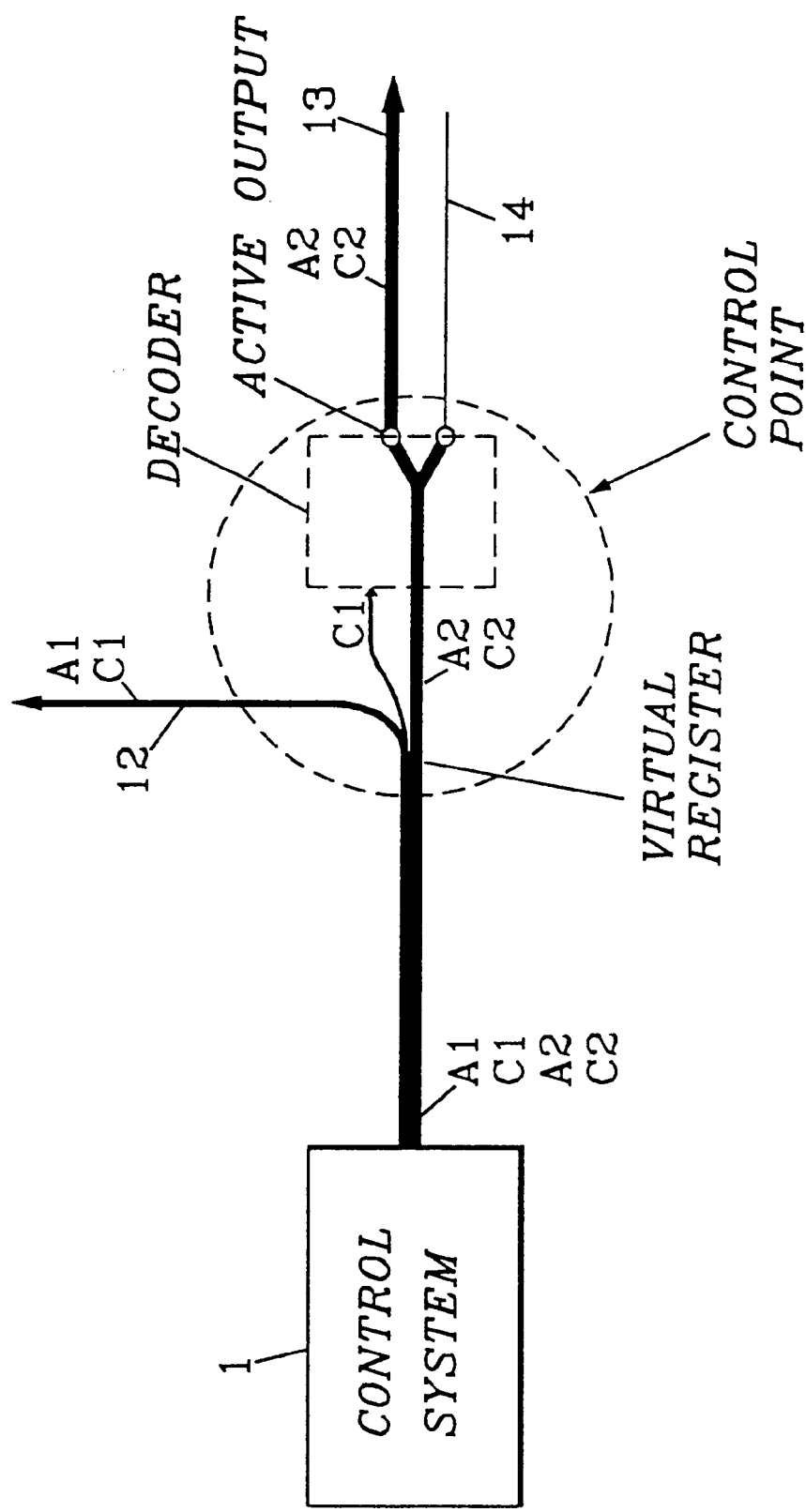
FIG. 2 is a schematic diagram of a practical implementation of a control point according to an illustrative embodiment of the invention.

FIG. 2 is a schematic diagram of a practical implementation of a control point according to an illustrative embodiment of the invention. In this particular example, the control system 1 transfers the control information C1, C2 and the address information A1, A2 in parallel over a link to a control point. Preferably, the control point comprises a virtual register, and the control and address information passes the virtual register flying. In the virtual register, the parallel information received from the control system is divided and passed on in different directions, as indicated in FIG. 2. The first control code C1 and its associated address information A1 are directed to the control store in Module A (not shown, see FIG. 1) on the hardware link 12. The second control code C2 and the address code A2 are transferred to a decoder provided in connection to the virtual register. The first control code C1 is also transferred to the decoder from the virtual register.

The decoder is preferably realized as a decoding and activating state machine in a conventional manner; by way of example as a gate network. The decoder generally includes a first control input for receiving the first control code C1, a second input for receiving the second control code C2 and the associated address code A2, and selectively active outputs that are connected to the hardware links 13 and 14, respectively. Each one of the selectively active outputs is connected to the second input by an internal connection, and to a respective one of the second and third hardware links 13, 14. The decoder, also referred to as a link activator, further comprises decoding circuitry that decodes the first control code C1 and activates one of the selectively active outputs in accordance with the decoded first control code, thus activating the corresponding hardware link. In this way, the second control code C2 and the associated address code A2 are forwarded through the activated output onto the corresponding hardware link. Consequently, it can be seen that the "activation" of the selectively active hardware links 13, 14 is handled by the decoder. The decoder decodes the bit or bits in the first control code C1 to determine which hardware link 13/14 to activate such that the control code C2 and the associated address code A2 are transported on the relevant hardware link 13/14. Here, the first control code C1 is used as control information in the control store 15 in module A, but also as information for activating the appropriate hardware link 13/14.

It should be understood that the switch 2 may include an arbitrary number of further switch modules, each of which comprises a respective control store that is connected to the control point through a selectively active hardware link, similar to the hardware links 13, 14. The decoder is then responsive to the first control code C1 to activate one of the selectively active hardware links, including the hardware links 13, 14 and the hardware links to the control stores of the further switch modules.

Figure 3:
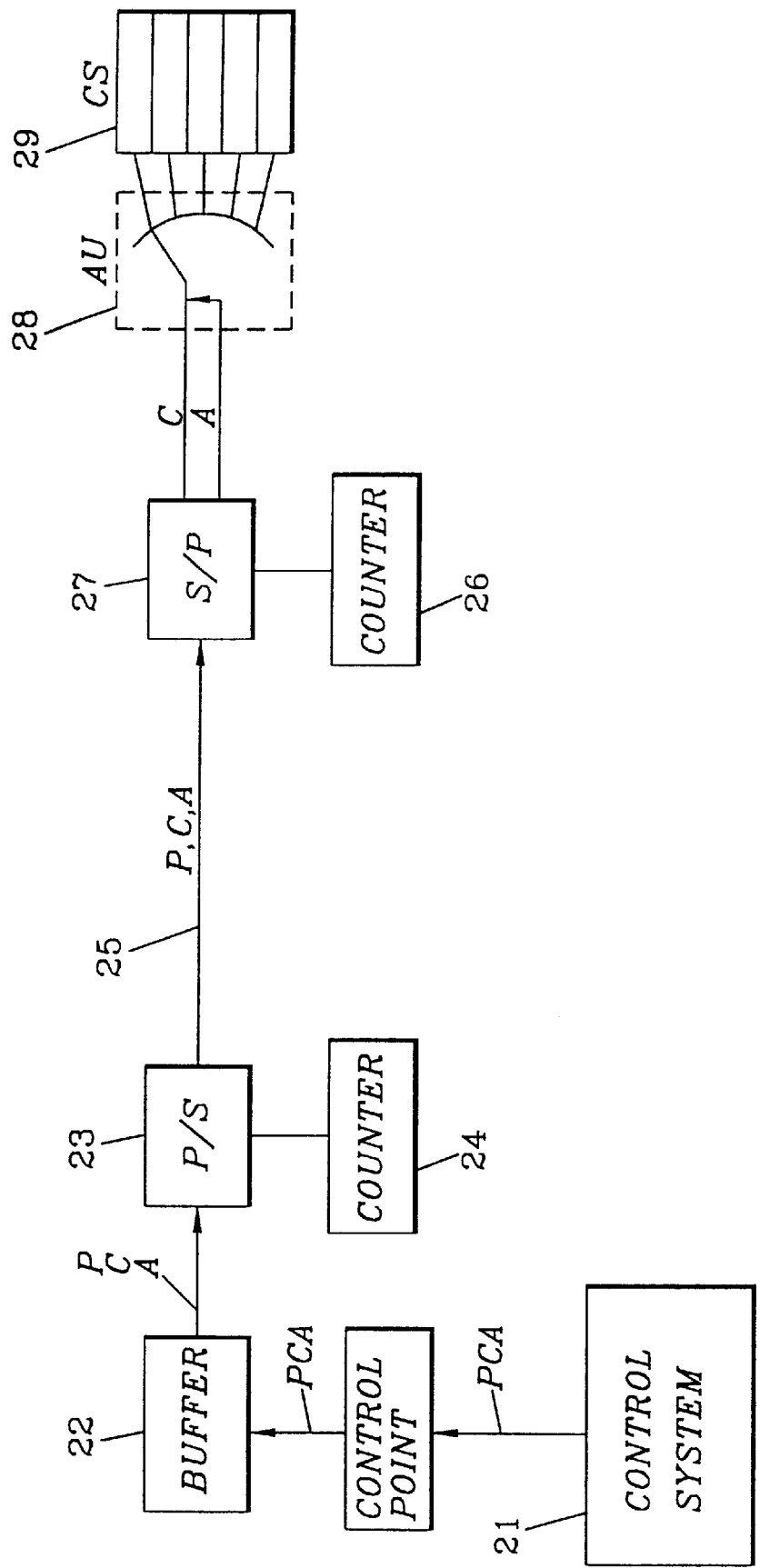
FIG. 3 is a schematic diagram generally illustrating the transfer of control information from a control system to a control point and from the control point over a hardware link to a control store, according to the invention.

FIG. 3 is a schematic diagram generally illustrating the transfer of control information from a control system to a control point and from the control point over a hardware link to a control store, according to the invention. A control system 21 writes control information C and address information A to a control point. The control point is preferably similar to that shown in FIG. 2. For simplicity, only a single hardware link and a single control store are illustrated in FIG. 3. The illustrated hardware link may as an example be thought of as any of the hardware links 12, 13 and 14 of FIG. 2; links 13 and 14 when active. The writing is performed flying such that the control and address information is directly transferred to a buffer 22 forming part of a hardware link. Normally, the control system 21 also provides parity information P associated with the, control and address information. The control information C, address information A and parity information P are then moved from the link buffer 22 to a parallel-to-serial converter P/S 23 under the control of a counter 24. A link interface 25 connects the P/S-converter 23 to a serial-to-parallel converter S/P 27, and transmits the address information A, the control information C and the parity bit P, in that order, to the S/P-converter 27. The link interface 25 is a serial interface containing time slots in which the bits of the information P, C, A to be transported over the interface are placed. The counter 24 controls the allocation of time slots in the serial flow on the link interface 25. The counter 26 controls the conversion of the serial information flow in the S/P-converter 27. The control information C and the address information A are forwarded from the S/P-converter 27 to an addressing unit (AU) 28 interfacing a control store (CS) 29. The control store 29 comprises a number of storage positions. First, the addressing unit 28 receives the address information A which points out a specific storage position in the control store 29. Next, the control information C is transferred from the S/P-converter 27 to the addressing unit 28 and subsequently to the designated storage position in the control store 29. The synchronization of the link interface 25 is handled by a synchronization signal that is available on all boards in the system.

In FIG. 3, the hardware link is implemented as a serial interface, and the complete hardware link is considered to include the buffer 22, the P/S-converter 23 with associated counter 24, the serial link interface 25 as well as the S/P-converter 27 with associated counter 26. It should be understood that the hardware link of FIG. 3 is merely an illustrative example of a hardware link, and that the invention is not limited to the illustrated embodiment. In fact, any suitable hardware link known to the art can be used to transfer control information to a control store. For example, if the control point and a corresponding control store are arranged on the same circuit board, it is of course appropriate to utilize a parallel interface.

For a better understanding, the invention will now be described with reference to an illustrative example of a modular or distributed communication switch. The communication switch is a modular time-space switch, in which the space-switching functionality of the overall switch core is divided between time-space (TS) switch modules and switch adapter modules. Accordingly, there are control stores in the time-space switch modules as well as in the switch adapters. This means that for each connection through the modular switch, control information has to be provided to the control store in a predetermined switch adapter module as well as to a predetermined control store in an associated switch module.

Figure 4:
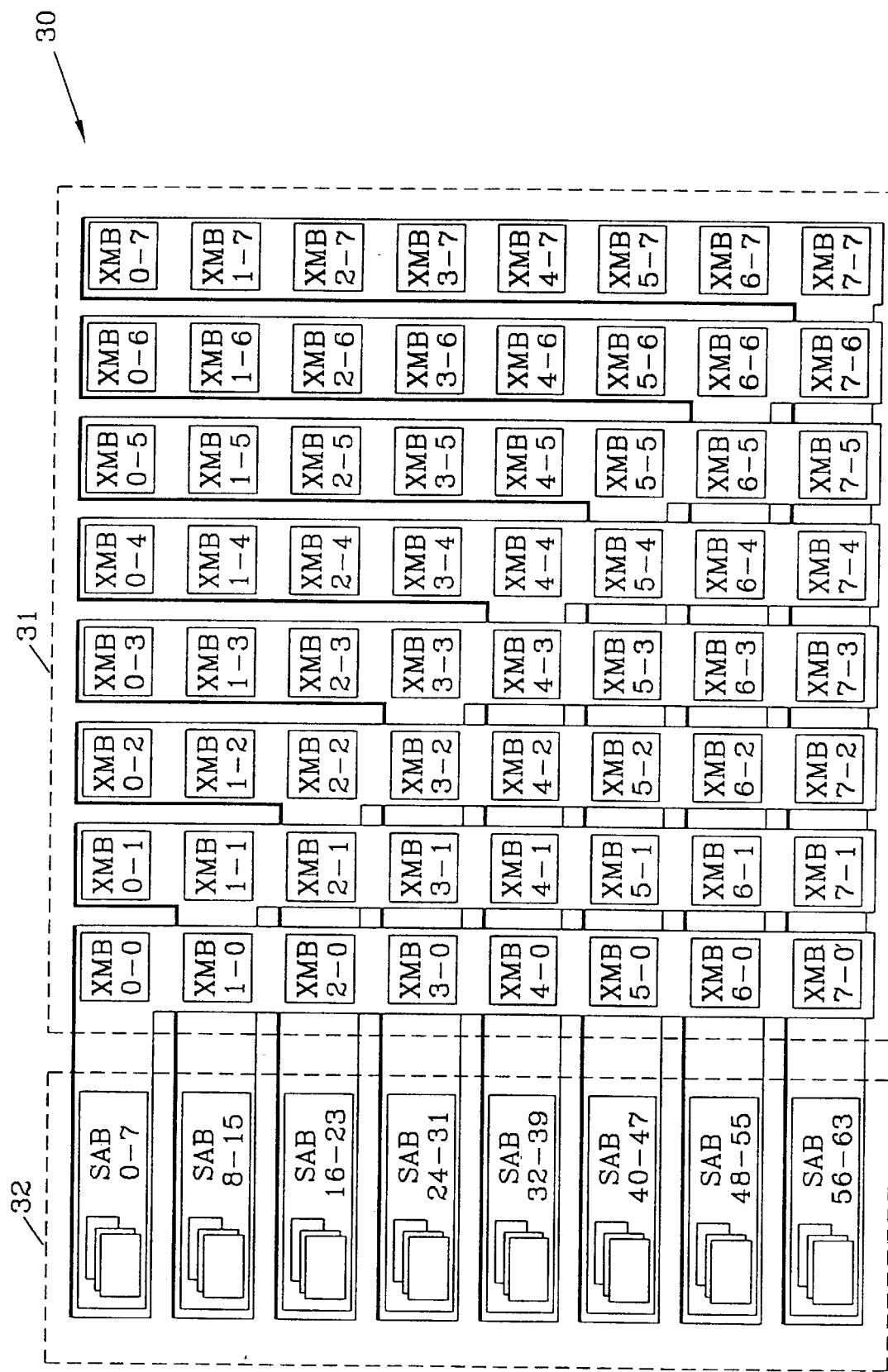
FIG. 4 is a schematic diagram of an illustrative example of the overall architecture of a modular switch structure based on TS-modules according to the invention.

FIG. 4 is a schematic diagram of an illustrative example of the overall architecture of a modular switch structure based on TS-modules and switch adapter modules. The modular switch structure 30 comprises a matrix 31 of TS-switch units, also referred to as TS-switch modules, XMB0-0 to XMB7-7, and a number of switch adapter modules or switch adapter boards 32 arranged in groups SAB0-7, SAB8-15, . . . , SAB56-63. Each group of switch adapter boards is associated with a predetermined row of TS-modules XMB in the matrix 31 for inputting data to be stored in the speech stores of these TS-modules XMB. Each group of switch adapter boards is also associated with a predetermined column of TS-modules XMB in the matrix 31 for output of selected data from the TS-modules XMB in the column. The switch adapter boards SAB generally act as input interface as well as output interface of the switch structure 30.

The association of each group of switch adapter boards with a respective predetermined column of TS-modules is indicated in FIG. 4, where each group of switch adapter boards is enclosed together with its corresponding column of TS-modules XMB by solid lines. The bold lines in FIG. 4 are provided only to facilitate the reading of the drawing. The association of each group of switch adapter boards with a respective predetermined row of TS-modules is quite straightforward and therefore not indicated in FIG. 4.

Figure 5:
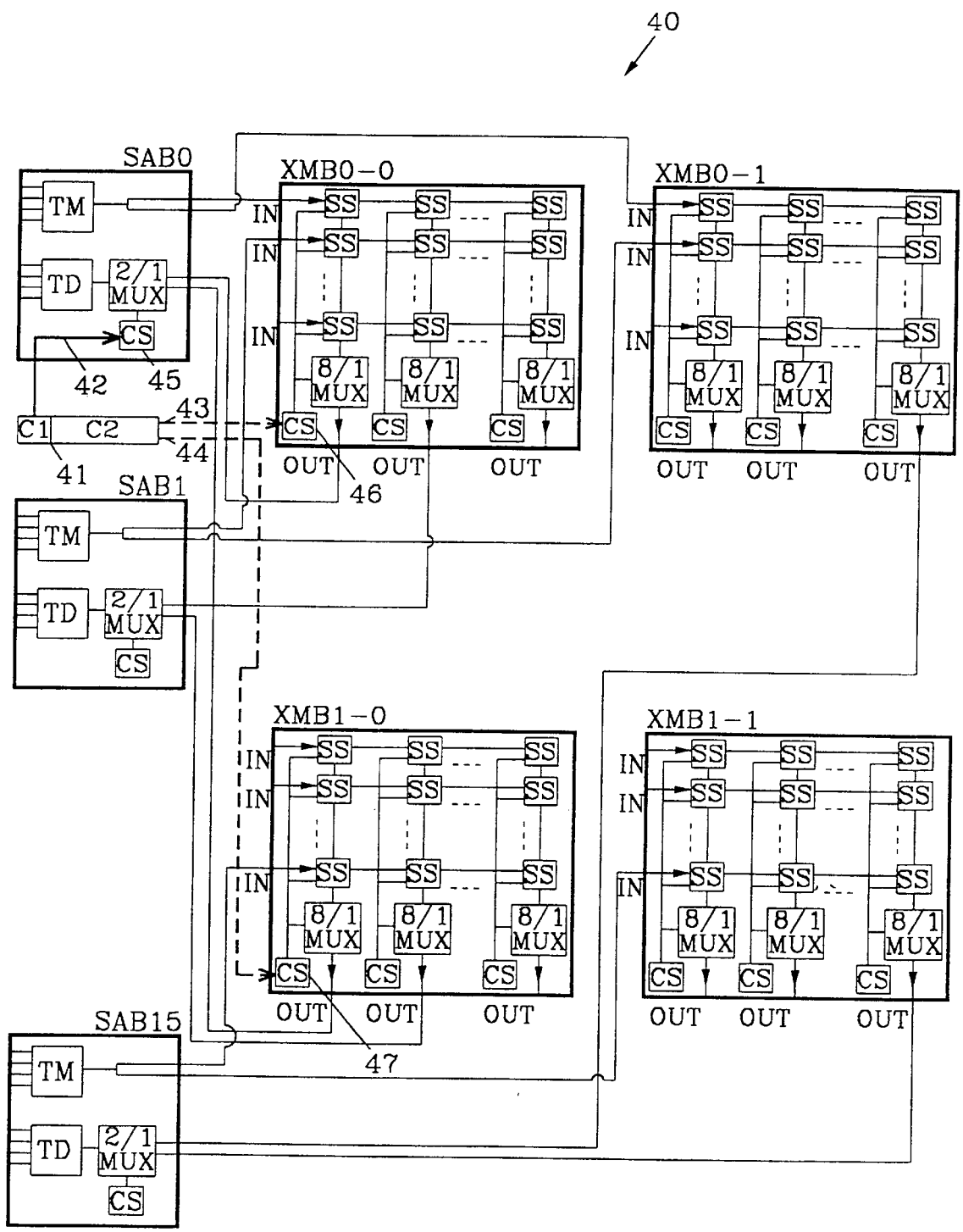
FIG. 5 is a schematic diagram of an example of a modular communication switch incorporating a system for providing control information to control stores according to the invention.

FIG. 5 is a more detailed schematic diagram of an example of a modular communication switch incorporating a system for providing control information to control stores according to the invention. The modular switch 40 comprises four TS-switch modules XMB0-0 to XMB1-1 arrangeable as a 2×2 matrix and 16 switch adapter modules or boards SAB0 to SAB15. For simplicity, only the switch adapter boards SAB0, SAB1 and SAB 15 are illustrated. The switch adapter boards SAB0 to SAB15 are arranged into two groups with 8 boards in each group; SAB0-SAB7 in a first group and SAB8-SAB15 in a second group. In this particular example, each TS-switch module XMB is a 64K TS-switch unit with an 8×8 speech store matrix of speech stores SS, associated multiplexors and control stores CS, 8 input terminals IN and 8 output terminals OUT.

The first group of adapter boards SAB0-7 is associated with the first row of TS-switch modules XMB0-0 and XMB0-1, and each switch adapter board SAB in that group is associated with a respective predetermined input terminal position of the TS-switch modules XMB0-0 and XMB0-1 in that row for transferring data from the switch adapter board to the TS-switch module speech stores SS that are associated with that input terminal position. Correspondingly, the second group of adapter boards SAB8-15 is associated with the second row of switch modules XMB1-0 and XMB1-1. Each switch adapter board SAB of the second group SAB8-15 is associated with a respective predetermined input terminal position of the switch modules XMB1-0 and XMB1-1 in the second row for transferring data to the speech stores SS associated with that input terminal position.

In this particular example, each switch adapter board SAB comprises an input interface for a number of incoming digital links in the front, a time-multiplexing unit TM, a distribution point, a controllable selector in the form of a 2/1 multiplexor 2/1 MUX associated with a control store CS 45.

The time-multiplexing unit TM multiplexes data from the incoming links into a single stream of time-multiplexed data, and the output terminal of the, time-multiplexing unit TM is connected to the distribution point which receives the stream of multiplexed data from the time-multiplexing unit. The distribution point is connected to the switch module input terminals IN at a predetermined input terminal position, as described above, and distributes the multiplexed data thereto via an interface such that all speech stores SS, in each of the switch modules XMB in the associated row, that are connected to an input terminal IN at that position receives the multiplexed data.

Each group of switch adapter boards is also associated with a predetermined column of switch modules XMB in the matrix. The first group of adapter boards SAB0-7 is associated with the first column of switch modules XMB0-0 and XMB1-0, and each switch adapter board SAB in that group is associated with a respective predetermined output terminal position of the switch modules XMB0-0 and XMB1-0 in that column for fetching data from the output terminals OUT at that position. Correspondingly, the second group of adapter boards SAB8-15 is associated with the second column of switch modules XMB0-1 and XMB1-1.

The 2/1 multiplexor 2/1 MUX in the switch adapter board is connected to the switch module output terminals OUT at a predetermined output terminal position for receiving data therefrom. The associated control store CS 45 is connected to the 2/1 multiplexor 2/1 MUX and holds control information which controls the multiplexor. The controllable 2/1 multiplexor selects data from one of the output terminals OUT at the predetermined output terminal position as selector output data, in response to the control information in the control store CS 45.

In FIG. 5, a system for providing control information to control stores according to the invention is indicated. For reasons of clarity and simplicity, only those parts of the modular switch structure 40 that are pertinent to the control information aspect of the invention will be described in the following.

In general, for a point-to-point connection through the modular switch 40 shown in FIG. 5 control information has to be provided to a control store in a predetermined switch adapter board as well as to a control store in a predetermined TS-switch module.

According to the present invention, for each point-to-point connection, the traffic control software in the control system (not shown) writes control information that establishes a complete point-to-point connection, into a single control point 41. From this control point, the control information is then provided to the relevant control stores through hardware links. Hence, the switch structure 40 further comprises a number of control points 41 and associated hardware links 42, 43, 44. Each control point 41 is associated with a respective switch adapter board. For simplicity, only a single control point 41 and a single set of hardware links 42, 43, 44 are indicated in FIG. 5. The control point 41 is operative to receive control information which includes a first control code C1 and a second control code C2. The first control code C1 relates to the control store 45 in the switch adapter board SAB0, and the second control code C2 relates to the control store 46/47 in one of the associated switch modules XMB0-0 and XMB1-0. The hardware link 42 connects the control point 41 to the control store 45 in the switch adapter board SAB0. The hardware links 43 and 44 are selectively active and connects the control point 41 to the control stores 46 and 47, respectively.

The first control code C1 is provided to the control store 45 through the hardware link 42. According to a preferred embodiment of the invention, this first control code C1 controls the 2/1 multiplexor 2/1 MUX associated with the control store 45, but also controls which one of the hardware links 43 and 44 that is to be activated. In the same manner as described above in connection with FIG. 2, a conventional decoder (not shown) receives and decodes the control code C1, and activates hardware link 43 or 44 based on the decoded control code C1. Next, the second control code C2 is provided on the activated hardware link 43/44 to the corresponding control store 46/47. The second control code C2 controls read-out of data from the TS-switch modules XMB.

Preferably, each control point 41 is arranged on its associated switch adapter board. This means that the hardware link from the control point 41 to the control store 45 in the switch adapter board is simplified compared to the hardware link of FIG. 3. No serial interface is required, since the control point 41 and the control store 45 are arranged on the same board, and the parallel information from the control point 41 is directly transferred to the control store 45 via an addressing unit.

According to the invention, there is generally no need to change the traffic control software for a distributed or modular TS-switch compared to the traffic control software for a conventional non-modular TS-switch core. This will be explained below with reference to an illustrative example.

First, assume that each input line to the TS-switch modules XMB handles 8192 time slots, and that each speech store SS and each control store CS in the TS-switch modules has 8192 positions, such that the overall switch structure 40 shown in FIG. 5 has a capacity of 128K and is capable of handling 131072 time slots numbered from 0 to 131071. The hardware links 43, 44 are preferably serial interfaces running at for example 65 Mb/s.

As a first example, if the incoming time slot 65535 of the overall switch 40 is to be retrieved by SAB0, the control system software writes the time slot number 65535, in the form of the binary code 0_1111_1111_1111_1111, into the control point 41 associated with SAB0. In this case, the first control code C1 is the most significant bit, a "0", and the second control code C2 comprises the remaining bits of the time slot number. The first control code C1 is provided to the control store 45 in the switch adapter board SAB0 through the hardware link 42, and controls the multiplexor 2/1 MUX associated with the control store 45. In this case, a "0" means that the multiplexor 2/1 MUX is set to be in contact with the first output of the switch module XMB0-0. The first control code C1 is also used to activate one of the hardware links 43 and 44. In this example, a "0" means that the hardware link 43 is activated. Hence, the second control code C2 is provided to the control store 46 in the switch module XMB0-0 and the incoming time slot of the TS-switch module XMB0-0 that corresponds to control code C2, i.e. time slot 65535 in XMB0-0, is retrieved from the first output of the switch module XMB0-0.

As a second example, if the incoming time slot 131071 of the overall switch 40 is to be retrieved by SAB0, the control system software writes the time slot number 131071, in the form of the binary code 1_1111_1111_1111_1111, into the control point 41 associated with SAB0. The first control code C1 is the most significant bit, now a "1", and the second control code C2 comprises the remaining bits of the time slot number. Since C1 is equal to a "1", the multiplexor 2/1 MUX associated with control store 45 is set to be in contact with the first output of the other switch module XMB1-0. Now, the first control code C1, a "1", activates the hardware link 44, and the second control code C2 is provided to the control store 47 in the switch module XMB1-0. Consequently, the incoming time slot of the TS-switch module XMB1-0 that corresponds to control code C2, i.e. time slot 65535 in XMB1-0, is retrieved from the first output of the switch module XMB1-0.

It is of course necessary to provide address information which decides to which outgoing time slot the retrieved incoming time slot is to be switched. This is preferably realized in the same manner as described in connection with FIG. 3. The address information determines the storage positions in the control stores 45 and 46/47 into which the control codes C1 and C2, respectively, are written. Preferably, conventional write logic receives the control code and address code in question and performs the actual writing of the control code into the corresponding control store according to the associated address code (see FIG. 3 and the addressing unit 28).

The traffic control software just writes the control information associated with a given point-to-point connection to a single point in the same manner as in an equivalent conventional TS-switch core. In this way, the traffic control software need not be concerned about the internal hardware configuration of the communication switch, and traffic control software already developed for conventional non-modular TS-switch cores can be used.

It is important to understand that the first control code C1 has a dual function: First, it acts as control information in the control store of a switch adapter board. Second, it activates one of the hardware links to the control stores in the associated TS-switch modules.

In the examples given above, the first control code C1 was a single bit, since a single bit is capable of differentiating between two different states "0" and "1". However, if the modular communication switch was to include a larger matrix of TS-switch modules XMB, the first control code C1 would have to be more than a single bit. Taking the modular switch of FIG. 4 as an example, an 8×8 matrix of TS-switch modules XMB0-0 to XMB7-7 is used. In that case, each switch adapter board includes a 8/1 multiplexor, and the control point associated with the switch adapter board is connected to an individual control store in each one of the TS-modules of a predetermined column in the 8×8 matrix through a respective hardware link.; making up a total of 8 hardware links for each control point. This means that the first control code C1 must be able to represent 8 different states, implying a 3-bit code ($2^3$=8) instead of a single bit code. The 3-bit control code C1 controls the 8/1 multiplexor in the associated switch adapter board, and controls which one of the 8 hardware links that is to be activated.

It is important to understand that the manner in which control information is provided to the control stores according to the invention is applicable to any switch in which control information for a point-to-point connection has to be provided to more than one control store, where the control information for a point-to-point connection includes at least a first control code and a second control code linked together as described above.

Figure 6:
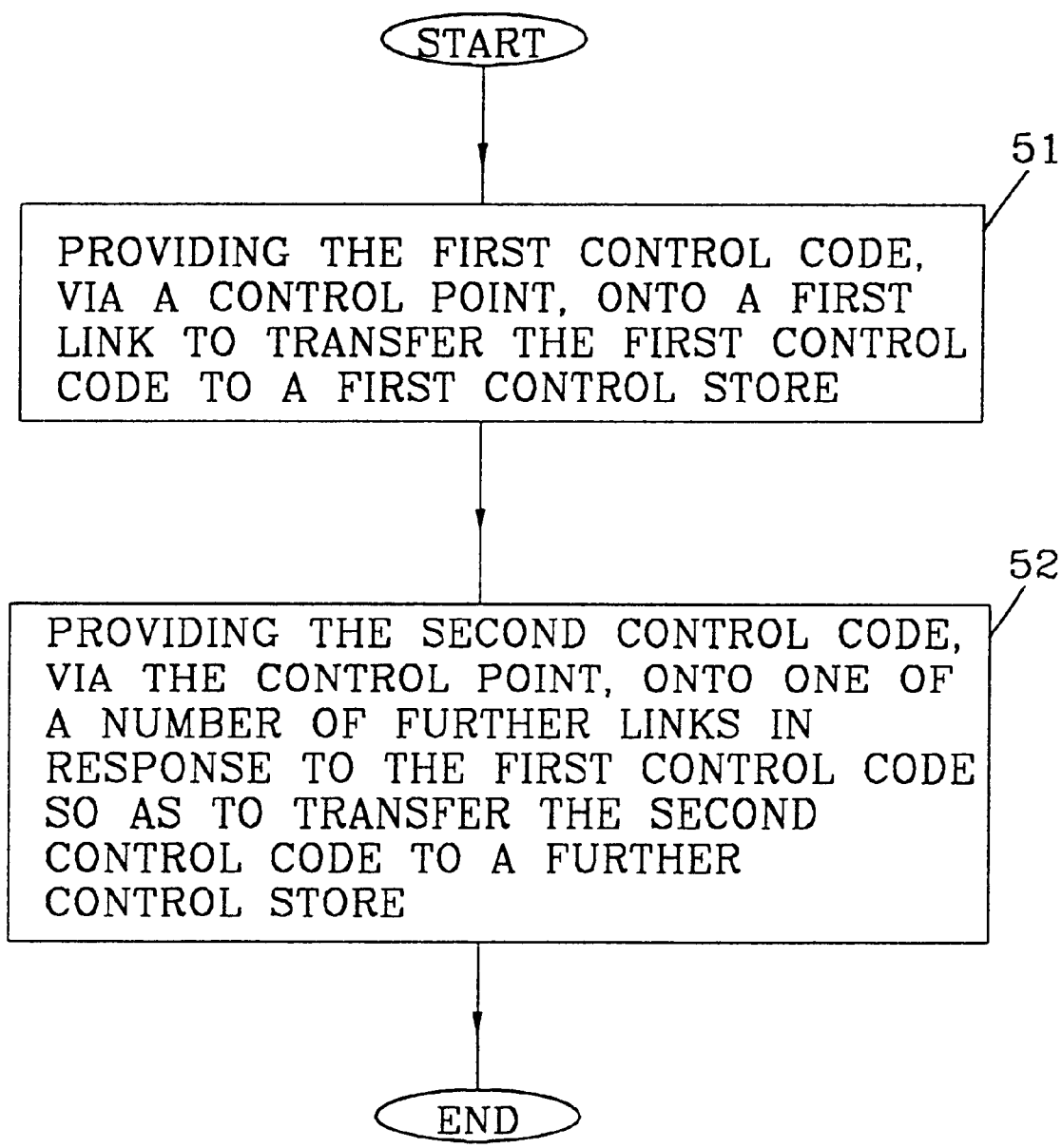
FIG. 6 is a schematic flow diagram illustrating a method for providing control information from a control system to control stores in a communication, switch, according to a preferred embodiment of the invention.

FIG. 6 is a schematic flow diagram illustrating a method for providing control information from a control system to control stores in a communication switch, according to a preferred embodiment of the invention. Here, the control information for a point-to-point connection includes at least a first control code and a second control code. In step 51, the first control code is provided, via a control point such as a virtual register, onto a first hardware link so as to transfer the first control code on the link to a first control store. In step 52, the second control code is provided, via the control point which further comprises a decoding activator, onto one of a number of further hardware links in response to the first control code so as to transfer the second control code on the further link to a further control store connected to the link.

The embodiments described above are merely given as examples, and it should be understood that the present invention is not limited thereto. It is of course possible to embody the invention in specific forms other than those described without departing from the spirit of the invention. Further modifications and improvements which retain the basic underlying principles disclosed and claimed herein are within the scope and spirit of the invention.

What is claimed is:

1. A system for providing control information for a point-to-point connection through a communication switch from a control system to control stores within said communication switch, said system comprising:

a control point for receiving control information from said control system to distribute said control information to predetermined control stores within said switch, said control information including at least a first control code and a second control a first hardware link providing said first control code to a predetermined first control store for storing said first control code;

a number of selectively active hardware links, each, one connecting said control point to a respective predetermined further control store within said switch to provide, when active, said second control code from said control point to said further control store for storing said second control code; and a link activator arranged to activate at least one of said selectively active hardware links in response to said first control code.

2. The system according to claim 1, wherein said first hardware link connects said control point to said first control store such that said first control code is provided from said control point to said first control store.

3. The system according to claim 1, wherein said link activator is a decoder responsive to said first control code, received at said control point, for decoding said first control code to determine which one of said selectively active hardware links to activate.

4. The system according to claim 1, wherein said link activator is a decoder including:

a first control input for receiving said first control code;

a second input for receiving said second control code;

selectively active outputs, each of which is connected to said second input by an internal connection, and to a respective one of said selectively active hardware links; and decoding circuitry connected to said first control input for decoding said first control code to activate one of said selectively active outputs so as to forward said second control code through the activated output, thus activating the corresponding hardware link.

5. The system according to claim 1, wherein said control point comprises a virtual register, said control information passing said virtual register flying, and said control information is transferred from said control system, via said virtual register, to said link activator.

6. The system according to claim 1, wherein said link activator is arranged to activate a single one of said selectively active hardware links in response to said first control code.

7. The system according to claim 1, wherein said communication switch is a modular or distributed switch which comprises a number of switch modules, and said control stores are arranged in different switch modules.

8. The system according to claim 1, wherein said communication switch is a modular or distributed switch which comprises a number of switch modules,
   said first control store being arranged in a first switch module operating as a space switch module, said further control stores being arranged respectively in further switch modules,
   said further switch modules cooperating with said first space switch module such that said first control code provided to said first control store in said first space switch module controls from which one of said further switch modules that data should be forwarded as output of the first space switch module.

9. The system according to claim 8, wherein said further switch modules are time-space switch modules, and said second control code controls read-out of data from said time-space switch modules.

10. The system according to claim 1, wherein said control point further receives first address information and second address information associated with said first control code and said second control code, respectively, from said control system,
   said first address information being provided together with said first control code onto said first hardware link and said second address information being provided together with said second control code onto at least one of said selectively active hardware links, and
   wherein said system further comprises write logic circuitry for writing said first and second control codes into said control stores according to said first and second address information, respectively.

11. The system according to claim 10, wherein said first address information determines the storage position in said first control store into which said first control code is written, and said second address information determines the storage position in said further control stores into which said second control code is written.

12. The system according to claim 1, wherein said first control code and said second control code constitute control information for a point-to-point connection through said communication switch.

13. A communication switch comprising a system for providing control information for a point-to-point connection through said communication switch from a control system to control stores within said communication switch, said system comprising:
   a control point for receiving control information from said control system to distribute said control information to predetermined control stores within said switch, said control information including at least a first control code and a second control code;
   a first hardware link providing said first control code to a predetermined first control store for storing said first control code;
   a number of selectively active hardware links, each one connecting said control point to a respective predetermined further control store within said switch to provide, when active, said second control code from said control point to said further control store for storing said second control code; and
   a link activator arranged to activate at least one of said selectively active hardware links in response to said first control code.

14. A system for providing control information for a point-to-point connection through a communication switch from a control system to control stores within said communication switch, said system comprising:
   means for receiving control information from said control system to distribute said control information to predetermined control stores within said switch, said control information including at least a first control code and a second control code;
   first link means connecting said receiving means to a predetermined first control store within said switch for providing said first control code from said receiving means to said first control store for storing said first control code;
   a number of selectively active link means, each one connecting said receiving means to a respective predetermined further control store within said switch for providing, when active, said second control code from said receiving means to said predetermined further control store for storing said second control code; and
   means for activating one of said selectively active link means in response to said first control code.

15. A system for providing control information for a point-to-point connection through a communication switch from a control system to control stores within said communication switch, said system comprising:
   a control point for receiving control information from said control system to distribute said control information to predetermined control stores within said switch, said control information including at least a first control code and a second control code;
   a first hardware link providing said first control code to a predetermined first control store for storing said first control code;
   a number of further hardware links, each one connecting said control point to respective predetermined further control store within said switch; and
   means for providing said second control code from said control point onto one of said further hardware links in response to said first control code, thus transferring said second control code to the corresponding further control store for storing said second control code.

16. A method for providing control information for a point-to-point connection through a communication switch from a control system to control stores within said communication switch, wherein the control information for a point-to-point connection comprises at least a first control code and a second control code, and said method includes the steps of:
   providing said first control code from said control system onto a first link to transfer said first control code to a first control store within said switch, said first control store being adapted for storing said first control code; and
   providing said second control code from said control system, via a control point, onto one of a number of further links in response to said first control code to transfer said second control code to a further control store within said switch, said further control store being adapted for storing said second control code.

17. The method according to claim 16, wherein said first control code is provided from said control system onto said first link via said control point.

18. The method according to claim 16, wherein said control point is selected from the group of: a register, a virtual register, a register and a decoder, and a virtual register and a decoder.

19. A system for providing control information from a control system to control stores in a communication switch, said communication switch comprising:
- a number of time-space switch modules which are arrangeable as a matrix having columns and rows, each one of said time-space switch modules including:
  - a number of input terminals,
  - a number of speech stores arrangeable as a speech store matrix for storing data, each speech store in a predetermined row of said speech store matrix being connected to the same input terminal for enabling all speech stores in said speech store row to receive the same set of data;
  - a number of multiplexors, each of which is associated with the speech stores of a respective column of said speech store matrix for retrieving data from said speech stores;
  - a number of module control stores, each of which is associated with a respective column of said speech store matrix and with the multiplexor that is associated with the same speech store column for controlling the associated multiplexor and the retrieval of data from said speech stores;
  - a number of output terminals respectively connected to said multiplexors; and
- a number of switch adapter units which are arrangeable in groups, each one of said groups of switch adapter units being associated with the time-space switch modules of a predetermined row of said switch module matrix for inputting data to the time-space switch modules of said row, and with the time-space switch modules of a predetermined column of said switch module matrix for outputting data from the switch modules of said column;
  - each switch adapter unit in a predetermined group of switch adapter units being associated with a predetermined output terminal position of the time-space switch modules in the switch module column associated with said group of switch adapter units and having a controllable selector which is connected to the switch module output terminals at said output terminal position for receiving data from all switch module output terminals at said position to select output data, and a switch adapter control store associated with and controlling said selector;

said system comprising:
- a number of control points, each of which receives control information for a point-to-point connection for distributing said control information to control stores in the switch;
- a number of primary hardware links;
- a number of secondary hardware links;
- each one of said control points being associated with a respective switch adapter unit, and connected to the switch adapter control store thereof through a predetermined primary hardware link for providing a first part of said control information to said switch adapter control store, and connected to module control stores in the time-space switch modules of the column of switch modules that is associated with the group of switch adapter units in which the respective switch adapter unit is located through predetermined secondary hardware links, respectively; and
- means for providing a second part of said control information from said control point onto one of said secondary hardware links in response to said first control information part, thus transferring said second control information part to the corresponding module control store.

* * * * *